(12) United States Patent
Wantland et al.

(10) Patent No.: US 11,800,841 B1
(45) Date of Patent: Oct. 31, 2023

(54) HYDRATION SYSTEM FOR AN INDOOR GARDEN CENTER

(71) Applicant: Haier US Appliance Solutions, Inc., Wilmington, DE (US)

(72) Inventors: Louis A. Wantland, Louisville, KY (US); Jordan Andrew Waymeyer, Louisville, KY (US); Kira Lynn Hartlage, Crestwood, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 17/854,298

(22) Filed: Jun. 30, 2022

(51) Int. Cl.
  *A01G 27/00* (2006.01)
  *A01G 9/24* (2006.01)
  *A01G 9/02* (2018.01)

(52) U.S. Cl.
  CPC .......... *A01G 27/003* (2013.01); *A01G 9/022* (2013.01); *A01G 9/247* (2013.01); *A01G 9/249* (2019.05); *A01G 27/001* (2013.01); *A01G 27/008* (2013.01)

(58) Field of Classification Search
  CPC ...... A01G 29/00; A01G 9/023; A01G 27/001; A01G 27/003; A01G 27/008; A01G 9/249; A01G 9/247; A01G 9/022
  See application file for complete search history.

(56) References Cited

U.S. PATENT DOCUMENTS

| 5,542,605 A | 8/1996 | Campua |
| 10,849,279 B2 | 12/2020 | Vuorinen et al. |
| 2008/0276534 A1 | 11/2008 | Bissonnette et al. |

(Continued)

FOREIGN PATENT DOCUMENTS

| CN | 109275556 A | 1/2019 | |
| WO | WO-2009010773 A1 * | 1/2009 | ............. A01G 9/023 |

(Continued)

OTHER PUBLICATIONS

Ishak et al., "Smart Home Garden Irrigation System Using Raspberry Pi", IEEE 13th Malaysia International Conference on Communications, Universiti Teknologi Malaysia, Nov. 28-30, 2017, 6 Pages.

*Primary Examiner* — Monica L Perry
*Assistant Examiner* — Aaron M Rodziwicz
(74) *Attorney, Agent, or Firm* — Dority & Manning, P.A.

(57) ABSTRACT

A gardening appliance includes a liner positioned within a cabinet and defining a grow chamber, a grow tower rotatably mounted within the liner and defining a root chamber, a hydration system comprising a water supply tank for storing water, a supply conduit fluidly coupling the water supply tank to a discharge nozzle, a supply pump for selectively urging the water through the discharge nozzle and a water level sensor operably coupled to the water supply tank. A controller obtains a water level of the water in the water supply tank using the water level sensor, determines a conservative water supply schedule based at least in part on the water level, and operates the hydration system to provide the water in accordance with the conservative water supply schedule, the conservative water supply schedule providing the water at a slower average hydration rate relative to the standard water supply schedule.

20 Claims, 9 Drawing Sheets

(56) References Cited

U.S. PATENT DOCUMENTS

| | | | | |
|---|---|---|---|---|
| 2013/0061521 A1* | 3/2013 | Cudmore | ............ | C05F 17/964 47/83 |
| 2013/0145690 A1* | 6/2013 | Cannon | ................ | A01G 9/023 47/66.7 |
| 2019/0124865 A1* | 5/2019 | Sunnen | .................... | A01G 7/02 |
| 2020/0170205 A1* | 6/2020 | Zamir | ................ | A01G 27/001 |
| 2020/0236864 A1* | 7/2020 | Henry | ................ | A01G 27/003 |
| 2021/0084844 A1 | 3/2021 | Hunter et al. | | |
| 2021/0176935 A1* | 6/2021 | Massey | .................... | A01G 9/26 |
| 2021/0352852 A1* | 11/2021 | Adams | .................... | A01G 9/26 |
| 2022/0007599 A1* | 1/2022 | Lim | ...................... | A01G 9/247 |
| 2022/0225579 A1* | 7/2022 | Robell | .................. | H05B 47/11 |

FOREIGN PATENT DOCUMENTS

| | | | | |
|---|---|---|---|---|
| WO | WO2016207900 A1 | 12/2016 | | |
| WO | WO-2020142851 A1 * | 7/2020 | ............ | A01G 31/02 |
| WO | WO-2021080139 A1 * | 4/2021 | ............ | A01G 24/00 |

\* cited by examiner

HYDRATION SYSTEM FOR AN INDOOR GARDEN CENTER

FIELD OF THE INVENTION

The present subject matter relates generally to systems for gardening plants indoors, and more particularly, to hydration systems for use in indoor gardening appliances.

BACKGROUND OF THE INVENTION

Conventional indoor garden centers include a cabinet defining a grow chamber having a number of trays or racks positioned therein to support seedlings or plant material, e.g., for growing herbs, vegetables, or other plants in an indoor environment. In addition, such indoor garden centers may include an environmental control system that maintains the growing chamber at a desired temperature or humidity. Certain indoor garden centers may also include hydration systems for watering the plants and/or artificial lighting systems that provide the light necessary for such plants to grow.

Conventional indoor gardens centers typically include a hydration system for providing a flow of water and nutrients onto plants stored therein to facilitate plant growth. For example, typical garden centers may include a removable and refillable supply tank that a user periodically refills with freshwater. During a hydration cycle, freshwater is pumped from the supply tank to hydrate plants, with excess water collecting in the sump and being stored in a wastewater reservoir. However, if supply tank is not replenished when empty, the plants stored in the garden center may not be watered, resulting in poor plant growth or death. In addition, if the water is consumed too quickly when an anticipated refill is not forthcoming (e.g., when the owner of the appliance is out of town), hydration that is critical for plant growth may not be available when needed.

Accordingly, an improved indoor garden center would be useful. More particularly, an indoor garden center with a hydration system that improves the utilization of available water sources would be particularly beneficial.

BRIEF DESCRIPTION OF THE INVENTION

Aspects and advantages of the invention will be set forth in part in the following description, or may be apparent from the description, or may be learned through practice of the invention.

In one exemplary embodiment, a gardening appliance defining a vertical direction is provided, including a liner positioned within a cabinet and defining a grow chamber, a grow tower rotatably mounted within the liner, the grow tower defining a root chamber and a plurality of apertures for receiving one or more plant pods, a hydration system comprising a water supply tank for storing water, a supply conduit fluidly coupling the water supply tank to a discharge nozzle, and a supply pump for selectively urging the water through the discharge nozzle, a water level sensor operably coupled to the water supply tank, and a controller in operative communication with the hydration system and the water level sensor. The controller is configured to: operate the hydration system to provide the water in accordance with a standard water supply schedule, obtain a water level of the water in the water supply tank using the water level sensor, determine a conservative water supply schedule based at least in part on the water level, and operate the hydration system to provide the water in accordance with the conservative water supply schedule, the conservative water supply schedule providing the water at a slower average hydration rate relative to the standard water supply schedule.

In another exemplary embodiment, a hydration system for a gardening appliance is provided. The gardening appliance includes a liner positioned within a cabinet and a grow tower rotatably mounted within the liner, the grow tower defining a root chamber and a plurality of apertures for receiving one or more plant pods. The hydration system includes a water supply tank for storing water, a supply conduit fluidly coupling the water supply tank to a discharge nozzle, a supply pump for selectively urging the water through the discharge nozzle, a water level sensor operably coupled to the water supply tank, and a controller in operative communication with the hydration system and the water level sensor. The controller is configured to operate the hydration system to provide the water in accordance with a standard water supply schedule, obtain a water level of the water in the water supply tank using the water level sensor, determine a conservative water supply schedule based at least in part on the water level, and operate the hydration system to provide the water in accordance with the conservative water supply schedule, the conservative water supply schedule providing the water at a slower average hydration rate relative to the standard water supply schedule.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
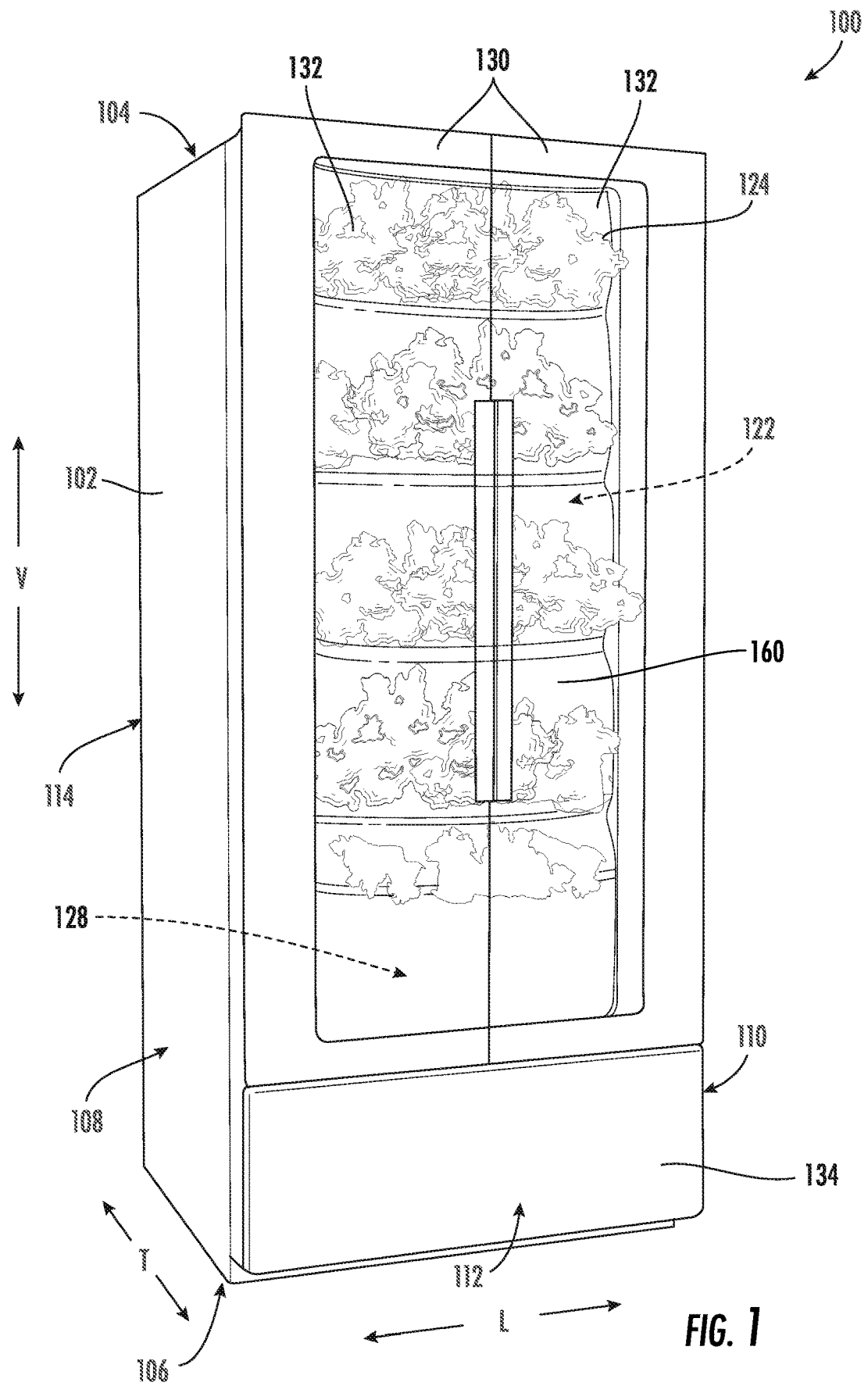
FIG. 1 provides a perspective view of a gardening appliance according to an exemplary embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to the figures, a gardening appliance 100 will be described in accordance with exemplary aspects of the present subject matter. According to exemplary embodiments, gardening appliance 100 may be used as an indoor garden center for growing plants. It should be appreciated that the embodiments described herein are intended only for explaining aspects of the present subject matter. Variations and modifications may be made to gardening appliance 100 while remaining within the scope of the present subject matter.

According to exemplary embodiments, gardening appliance 100 includes a cabinet 102 that is generally configured for containing and/or supporting various components of gardening appliance 100 and which may also define one or more internal chambers or compartments of gardening appliance 100. In this regard, as used herein, the terms "cabinet," "housing," and the like are generally intended to refer to an outer frame or support structure for gardening appliance 100, e.g., including any suitable number, type, and configuration of support structures formed from any suitable materials, such as a system of elongated support members, a plurality of interconnected panels, or some combination thereof. It should be appreciated that cabinet 102 does not necessarily require an enclosure and may simply include open structure supporting various elements of gardening appliance 100. By contrast, cabinet 102 may enclose some or all portions of an interior of cabinet 102. It should be appreciated that cabinet 102 may have any suitable size, shape, and configuration while remaining within the scope of the present subject matter.

As illustrated, gardening appliance 100 generally defines a vertical direction V, a lateral direction L, and a transverse direction T, each of which is mutually perpendicular, such that an orthogonal coordinate system is generally defined. The horizontal direction is generally intended to refer to a direction perpendicular to the vertical direction V (e.g., within a plane defined by the lateral direction L and the transverse direction T). Cabinet 102 generally extends between a top 104 and a bottom 106 along the vertical direction V, between a first side 108 (e.g., the left side when viewed from the front as in FIG. 1) and a second side 110 (e.g., the right side when viewed from the front as in FIG. 1) along the lateral direction L, and between a front 112 and a rear 114 along the transverse direction T. In general, terms such as "left," "right," "front," "rear," "top," or "bottom" are used with reference to the perspective of a user accessing gardening appliance 100.

Gardening appliance 100 may include an insulated liner 120 positioned within cabinet 102. Liner 120 may at least partially define an internal temperature-controlled chamber, referred to herein generally as a climate-controlled chamber 122, within which plants 124 may be grown. Although gardening appliance 100 is referred to herein as growing plants 124, it should be appreciated that other organisms or living things may be grown or stored in gardening appliance 100. For example, algae, fungi (e.g., including mushrooms), or other living organisms may be grown or stored in gardening appliance 100. The specific application described herein is not intended to limit the scope of the present subject matter in any manner.

Cabinet 102, or more specifically, liner 120 may define a substantially enclosed back portion 126 (e.g., proximate rear 114 of cabinet 102). In addition, cabinet 102 and liner 120 may define a front opening, referred to herein as front display opening 128 (e.g., proximate front 112 of cabinet 102), through which a user of gardening appliance 100 may access climate-controlled chamber 122, e.g., for harvesting, planting, pruning, or otherwise interacting with plants 124. According to an exemplary embodiment, enclosed back portion 126 may be defined as a portion of liner 120 that defines climate-controlled chamber 122 proximate rear side 114 of cabinet 102. In addition, front display opening 128 may generally be positioned proximate or coincide with front side 112 of cabinet 102.

Figure 2:
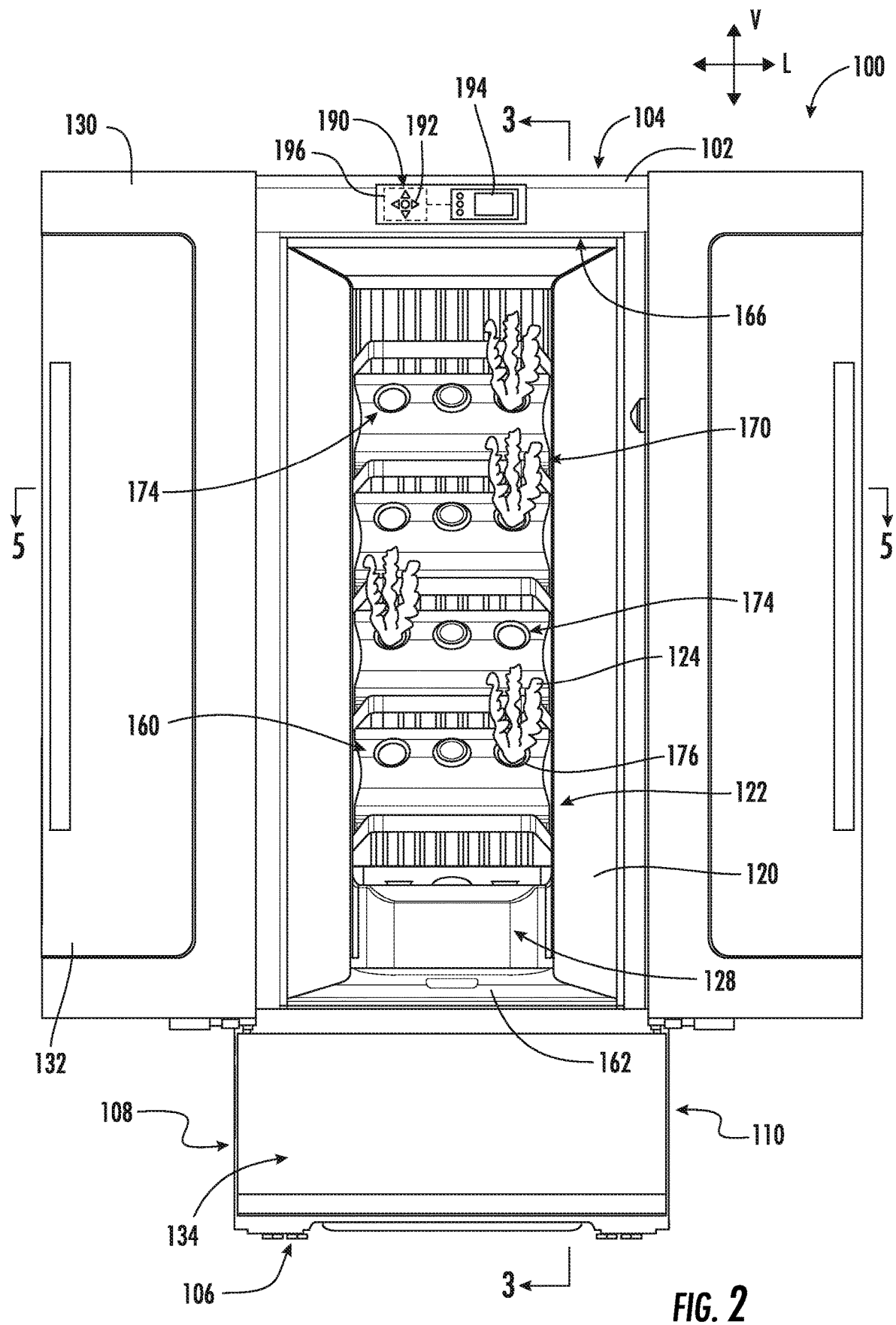
FIG. 2 depicts a front view of the exemplary gardening appliance of FIG. 1 with the doors open according to an exemplary embodiment of the present subject matter.

Gardening appliance 100 may further include one or more doors 130 that are rotatably mounted to cabinet 102 for providing selective access to climate-controlled chamber 122. For example, FIG. 1 illustrates doors 130 in the closed position such that they may help insulate climate-controlled chamber 122. By contrast, FIG. 2 illustrates doors 130 in the open positioned to permit access to climate-controlled chamber 122 and plants 124 stored therein. Doors 130 may further include a transparent window 132 through which a user may observe plants 124 without opening doors 130.

Although doors 130 are illustrated as being rectangular and being mounted on front side 112 of cabinet 102 in FIGS. 1 and 2, it should be appreciated that according to alternative embodiments, doors 130 may have different shapes, mounting locations, etc. For example, doors 130 may be curved, may be formed entirely from glass, etc. In addition, doors 130 may have integral features for controlling light passing into and/or out of climate-controlled chamber 122, such as internal louvers, tinting, UV treatments, polarization, etc. One skilled in the art will appreciate that other chamber and door configurations are possible and within the scope of the present subject matter.

According to the illustrated embodiment, cabinet 102 further defines a drawer 134 positioned proximate bottom 106 of cabinet 102 and being slidably mounted to cabinet 102 for providing convenient storage for plant nutrients, system accessories, water filters, etc. In addition, behind drawer 134 is a mechanical compartment 136 for receipt of an environmental control system including a sealed system for regulating the temperature within climate-controlled chamber 122, as described in more detail below.

Figure 3:
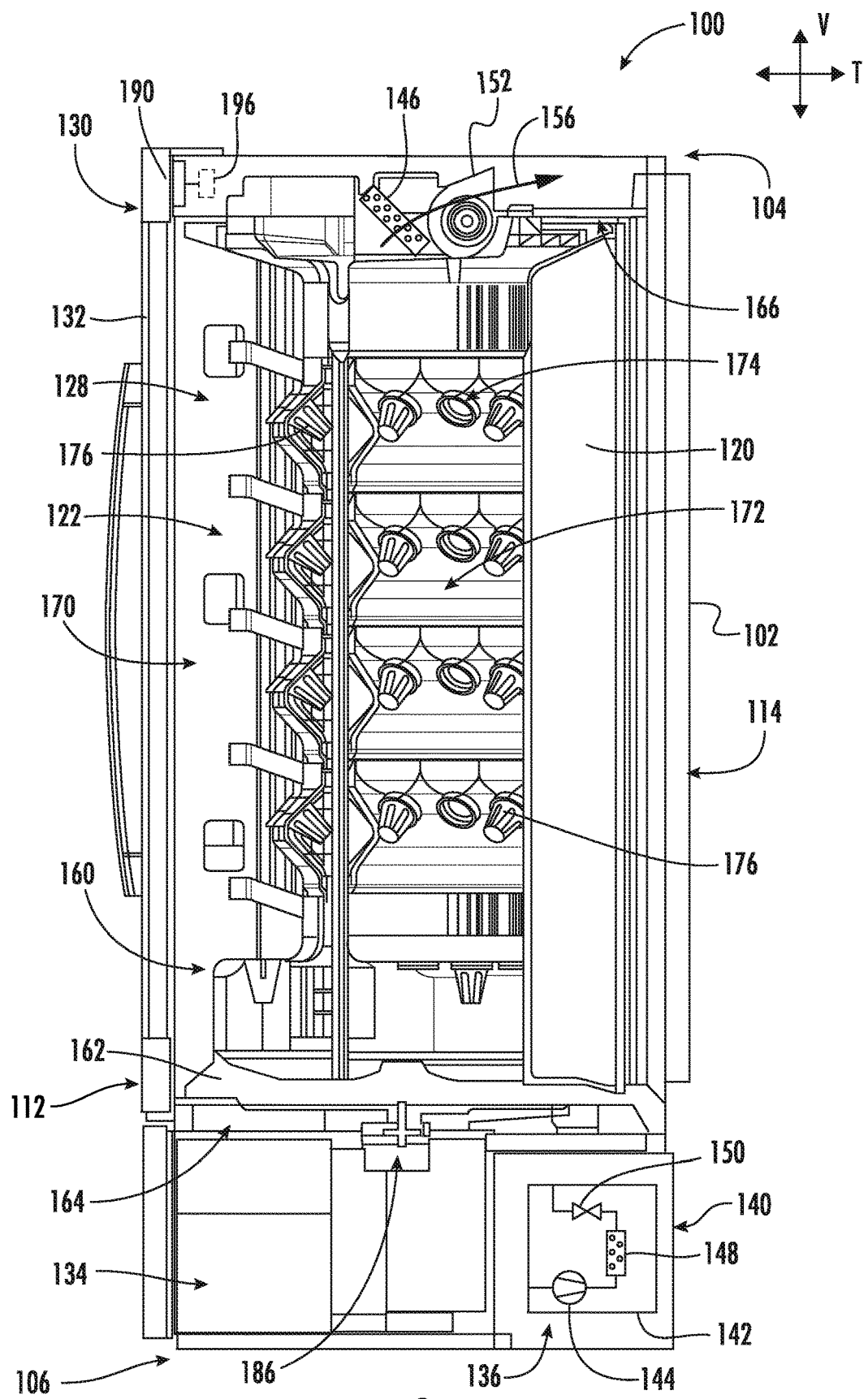
FIG. 3 is a cross sectional view of the exemplary gardening appliance of FIG. 1, taken along Line 3-3 from FIG. 2.

FIG. 3 provides a schematic view of certain components of an environmental control system 140 that may be used to regulate a climate or environment within climate-controlled chamber 122. Specifically, environmental control system 140 may include one or more subsystems for regulating temperature, humidity, hydration, nutrient dosing, lighting, and any other aspects of the environment within one or more portions of climate-controlled chamber 122, e.g., as desired to facilitate improved or regulated growth of plants 124 positioned therein. Although exemplary subsystems and subsystem configurations are described below, it should be appreciated that aspects of environmental control system 140 may vary while remaining within the scope of the present subject matter.

As illustrated, environmental control system 140 includes a sealed system 142 that is generally configured for regulating a temperature and/or humidity within one or more regions of climate-controlled chamber 122. In this regard, as shown schematically in FIG. 3, sealed system 142 may be located partially within mechanical compartment 136 and includes a compressor 144, a first heat exchanger or evaporator 146 and a second heat exchanger or condenser 148. As is generally understood, compressor 144 is generally operable to circulate or urge a flow of refrigerant through sealed system 142, which may include various conduits which may be utilized to flow refrigerant between the various components of sealed system 142. Thus, evaporator 146 and condenser 148 may be between and in fluid communication with each other and compressor 144.

During operation of sealed system 142, refrigerant flows from evaporator 146 and to compressor 144. For example, refrigerant may exit evaporator 146 as a fluid in the form of a superheated vapor. Upon exiting evaporator 146, the refrigerant may enter compressor 144, which is operable to compress the refrigerant and direct the compressed refrigerant to condenser 148. Accordingly, the pressure and temperature of the refrigerant may be increased in compressor 144 such that the refrigerant becomes a more superheated vapor.

Condenser 148 is disposed downstream of compressor 144 and is operable to reject heat from the refrigerant. For example, the superheated vapor from compressor 144 may enter condenser 148 and transfer energy to air surrounding condenser 148 (e.g., to create a flow of heated air). In this manner, the refrigerant condenses into a saturated liquid and/or liquid vapor mixture. A condenser fan (not shown) may be positioned adjacent condenser 148 and may facilitate or urge the flow of heated air across the coils of condenser 148 (e.g., from ambient atmosphere) in order to facilitate heat transfer.

According to the illustrated embodiment, an expansion device or a variable electronic expansion valve 150 may be further provided to regulate refrigerant expansion. During use, variable electronic expansion valve 150 may generally expand the refrigerant, lowering the pressure and temperature thereof. In this regard, refrigerant may exit condenser 148 in the form of high liquid quality/saturated liquid vapor mixture and travel through variable electronic expansion valve 150 before flowing through evaporator 146. Variable electronic expansion valve 150 is generally configured to be adjustable, e.g., such that the flow of refrigerant (e.g., volumetric flow rate in milliliters per second) through variable electronic expansion valve 150 may be selectively varied or adjusted.

Evaporator 146 is disposed downstream of variable electronic expansion valve 150 and is operable to heat refrigerant within evaporator 146, e.g., by absorbing thermal energy from air surrounding the evaporator (e.g., to create a flow of cooled air). For example, the liquid or liquid vapor mixture refrigerant from variable electronic expansion valve 150 may enter evaporator 146. Within evaporator 146, the refrigerant from variable electronic expansion valve 150 receives energy from the flow of cooled air and vaporizes into superheated vapor and/or high-quality vapor mixture. An air handler or evaporator fan 152 is positioned adjacent evaporator 146 and may facilitate or urge the flow of cooled air across evaporator 146 in order to facilitate heat transfer. From evaporator 146, refrigerant may return to compressor 144 and the vapor-compression cycle may continue.

As explained above, environmental control system 140 includes a sealed system 142 for providing a flow of heated air or a flow cooled air throughout climate-controlled chamber 122 as needed. To direct this air, environmental control system 140 may include a duct system 154 for directing the flow of temperature regulated air, identified herein simply as flow of air 156 (see, e.g., FIG. 3). In this regard, for example, evaporator fan 152 can generate a flow of cooled air as the air passes over evaporator 146 and a condenser fan (not shown) can generate a flow of heated air as the air passes over condenser 148.

This temperature-regulated flow of air 156 may be routed through a cooled air supply duct and/or heated air may be routed through a heated air supply duct (not shown). In this regard, it should be appreciated that environmental control system 140 may generally include a plurality of ducts, dampers, diverter assemblies, and/or air handlers to facilitate operation in a cooling mode, in a heating mode, in both a heating and cooling mode, or any other mode suitable for regulating the environment within climate-controlled chamber 122. It should be appreciated that duct system 154 may vary in complexity and may regulate the flows of air from sealed system 142 in any suitable arrangement through any suitable portion of climate-controlled chamber 122.

Although an exemplary sealed system 142 and duct system 154 are illustrated and described herein, it should be appreciated that variations and modifications may be made to sealed system 142 and/or duct system 154 while remaining within the scope of the present subject matter. For example, sealed system 142 may include additional or alternative components, duct system 154 may include additional or different ducting configurations, etc. For example, according to the illustrated embodiment, evaporator 146 and evaporator fan 152 may be positioned at top 104 of cabinet 102 and refrigerant may be routed from mechanical compartment 136 and through cabinet 102 to evaporator 146. In addition, it should be appreciated that gardening appliance 100 may have one or more subsystems integrated with or operably coupled to duct system 154 for filtering the flow of air 156, regulating the concentration of one or more gases within the flow of air 156, etc.

Referring now generally to FIGS. 1 through 7, gardening appliance 100 generally includes a rotatable carousel, referred to herein as a grow tower 160 that is mounted within liner 120, e.g., such that it is within climate-controlled chamber 122. More specifically, grow tower 160 may be positioned on top of a turntable 162 that is rotatably mounted to a sump 164 of gardening appliance 100. In general, grow tower 160 extends along the vertical direction V from sump 164 to a top wall 166 of climate-controlled chamber 122.

In addition, grow tower 160 is generally rotatable about a central axis 168 defined by turntable 162. Specifically, according to the illustrated embodiment, central axis 168 is parallel to the vertical direction V. However, it should be appreciated that central axis 168 could alternatively extend in any suitable direction, e.g., such as the horizontal direction (e.g., defined by the lateral direction L and the transverse direction T). In this regard, grow tower 160 generally defines an axial direction A, i.e., parallel to central axis 168, a radial direction R that extends perpendicular to central axis 168, and a circumferential direction C that extends around central axis 168 (e.g., in a plane perpendicular to central axis 168).

As illustrated, grow tower 160 may generally separate, divide, or partition climate-controlled chamber 122 into a plurality of grow chambers (e.g., identified generally by reference numeral 170). More specifically, grow chambers 170 are generally defined between grow tower 160 and liner 120 or between grow tower 160 and doors 130. In general, grow chambers 170 are intended to support the leafy growth of plants 124 (e.g., or other portions of plants 124 other than the plant roots). According to the illustrated embodiment, grow tower 160 divides climate control chamber 122 into three grow chambers 170, referred to herein generally as a first chamber, a second chamber, and a third chamber. As illustrated, these grow chambers 170 are circumferentially spaced relative to each other and define substantially separate and distinct growing environments. As such, each grow chamber 170 may receive plants 124 having different growth needs and the grow environment within each respective grow chamber 170 may be maintained as grow tower 160 is rotated within climate-controlled chamber 122.

In addition, according to the illustrated embodiment, grow tower 160 may generally define an internal chamber, referred to herein as a root chamber 172. In general, root chamber 172 may be substantially sealed relative to (or isolated from) grow chambers 170 and is configured for containing the roots of plants 124 throughout the growing process. As will be described in more detail below, grow tower 160 may generally define one or more apertures 174 that are defined through grow tower 160 to permit access between grow chambers 170 and root chamber 172. According to exemplary embodiments, these apertures 174 may be configured to receive plant pods 176 into root chamber 172.

Plant pods 176 generally contain seedlings, root balls, or other plant material for growing plants 124 positioned within a mesh or other support structure through which roots of plants 124 may grow within grow tower 160. A user may insert a portion of plant pod 176 (e.g., a seed end or root end) having the desired seeds through one of the plurality of apertures 174 into root chamber 172. A plant end (e.g., opposite the root end) of the plant pod 176 may remain within grow chamber 170 such that plants 124 may grow from grow tower 160 such that they are accessible by a user.

As will be explained below, water and other nutrients may be supplied to the root end of plant pods 176 within root chamber 172. For example, a hydration system may be configured to provide a flow of hydrating mist including water, nutrients, and other suitable constituents for providing the desirable growth environment for plants 124. According to exemplary embodiments, apertures 174 may be covered by a flat flapper seal or seal cap (not shown) to prevent hydrating mist from escaping root chamber 172 when no plant pod 176 is installed and to facilitate improved climate control within root chamber 172 and grow chambers 170. In addition, according to the illustrated embodiment, root chamber 172 may be operably coupled with sealed system 142 for facilitating suitable climate control within the root chamber 172, e.g., to achieve desirable growing conditions.

Although grow tower 160 described and illustrated above includes a single root chamber 172, it should be appreciated that according to alternative exemplary embodiments, grow tower 160 may further include one or more internal dividers (not shown) that are positioned within root chamber 172 to divide root chamber 172 into a plurality of sub-chambers or root chambers. Each of these root chambers may be partially or substantially isolated from the other root chambers to facilitate independent climate control, hydration, gas regulation, etc. In addition, each of these root chambers may be in fluid communication with one of the plurality of grow chambers 170 through the plurality of apertures 174.

Notably, it may be desirable according to exemplary embodiments to form a fluid-tight seal between the grow tower 160 and liner 120. In this manner, as grow tower 160 rotates within climate-controlled chamber 122, grow chambers 170 may remain fluidly isolated from each other. Therefore, according to an exemplary embodiment, grow tower 160 may generally define a grow module diameter (e.g., defined by its substantially circular footprint formed in a horizontal plane). Similarly, enclosed back portion 126 of liner 120 may be substantially cylindrical and may define a liner diameter (not labeled). In order to prevent a significant amount of air from escaping between grow tower 160 and liner 120, and in order to fluidly isolate the various grow chambers 170, the liner diameter may be substantially equal to or slightly larger than the grow module diameter.

Figure 7:
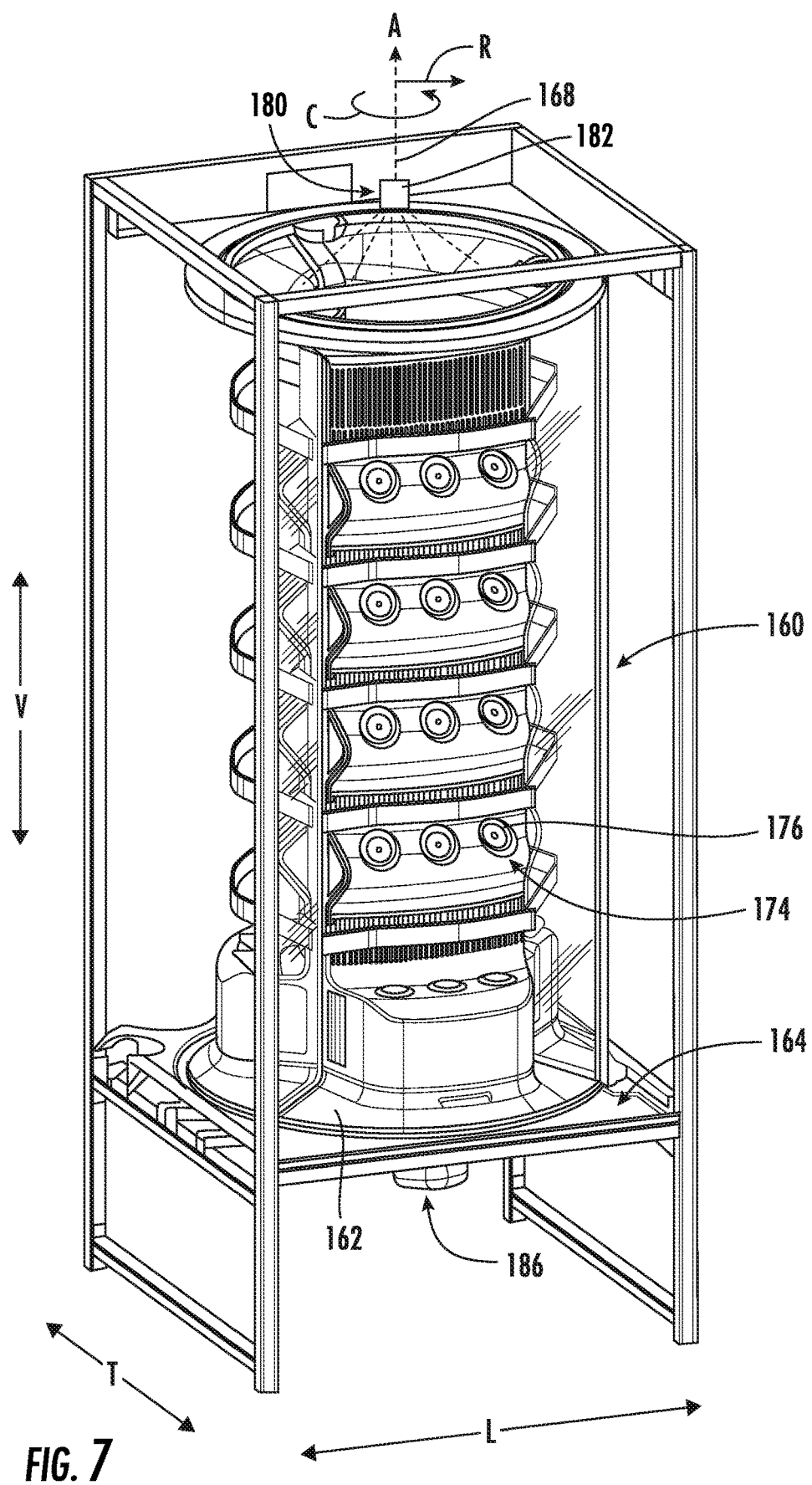
FIG. 7 provides a perspective view of a grow tower of the exemplary gardening appliance of FIG. 1 according to an exemplary embodiment of the present subject matter.

As best shown in FIG. 7, environmental control system 140 may further include a hydration system 180 which is generally configured for providing water and/or nutrients to plants 124 to support their growth. Specifically, according to the illustrated embodiment, hydration system 180 may be fluidly coupled to a water supply and or nutrient distribution assembly to selectively provide desirable quantities and concentrations of hydration, nutrients, and/or other fluids onto plants 124 to facilitate improved plant growth. For example, hydration system 180 includes misting device 182 (e.g., such as a fine mist spray nozzle or nozzles) that is fluidly coupled to a water supply (not shown). For example, the water supply may be a reservoir containing water (e.g., distilled water) or may be a direct connection municipal water supply. According to exemplary embodiments, hydration system 180 may include one or more pumps (not shown) for providing a flow of liquid nutrients to misting device 182. In this regard, for example, water or nutrients that are not absorbed by roots of plants 124 may fall under the force of gravity into sump 164 and these pumps may be fluidly coupled to sump 164 to recirculate the water through misting device 182.

According to the illustrated embodiment, misting device 182 is positioned at a top of root chamber 172 and may be configured for charging root chamber 172 with mist for hydrating the roots of plants 124. Alternatively, misting devices 182 may be positioned at a bottom of root chamber 172 (e.g., within sump 164) for spraying a mist or water into root chamber 172. Because various plants 124 may require different amounts of water for desired growth, hydration system 180 may alternatively include a plurality of misting devices 182, e.g., all coupled to the water supply and/or nutrient supplies. This plurality of misting devices 182 may be spaced apart at along the vertical direction V within root chamber 172. In this manner, these misting devices 182 may provide different concentrations of hydration and/or nutrients to different regions within root chamber 172.

Notably, environmental control system 140 described above is generally configured for regulating the temperature and humidity (e.g., or some other suitable water level quantity or measurement) within one or all of the plurality of chambers 170 and/or root chambers 172 independently of each other. In this manner, a versatile and desirable growing environment may be obtained for each and every chamber 170.

Figure 5:
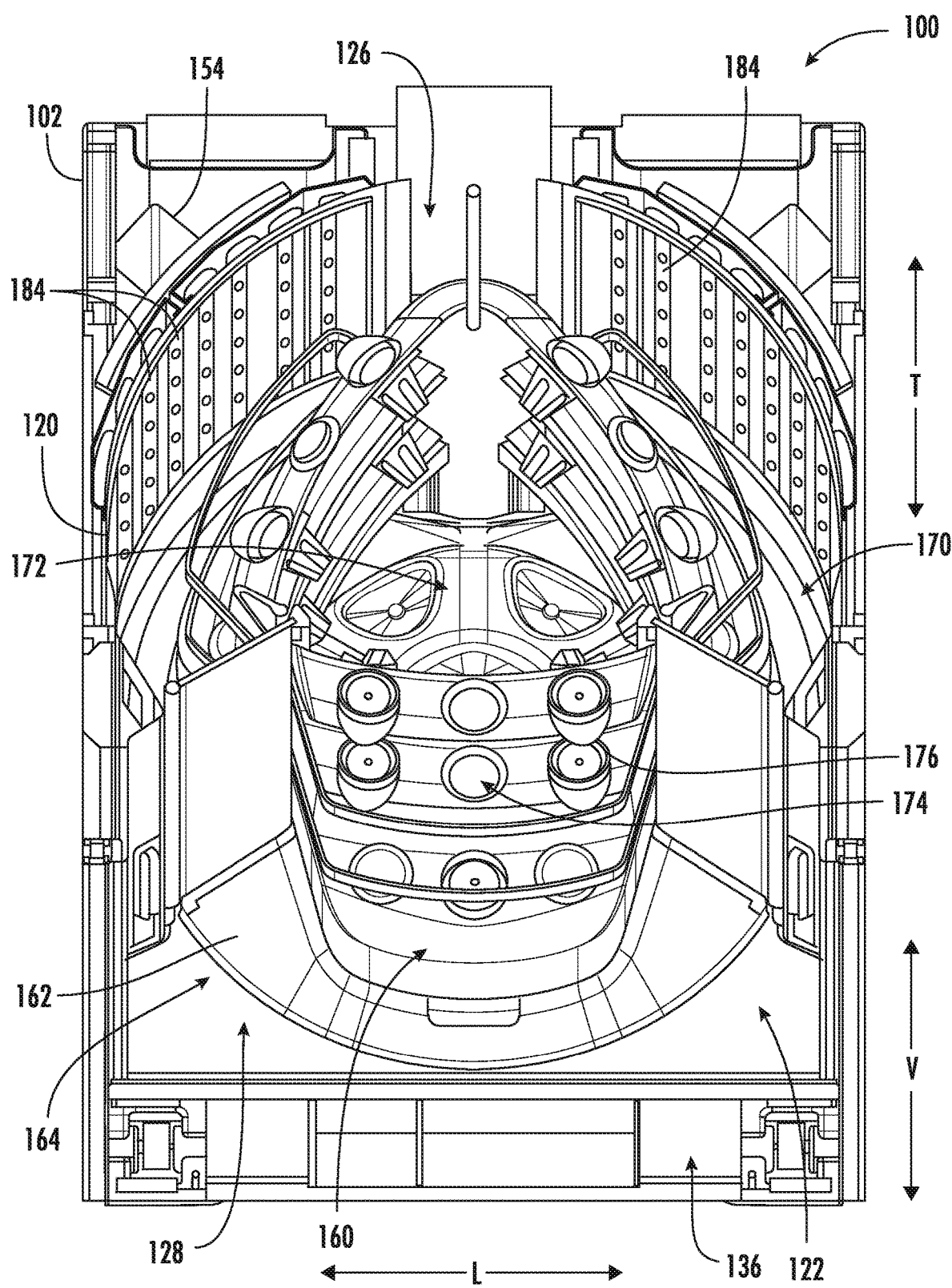
FIG. 5 is a perspective cross-sectional view of the exemplary gardening appliance of FIG. 1, taken along Line 5-5 from FIG. 2.
Figure 6:
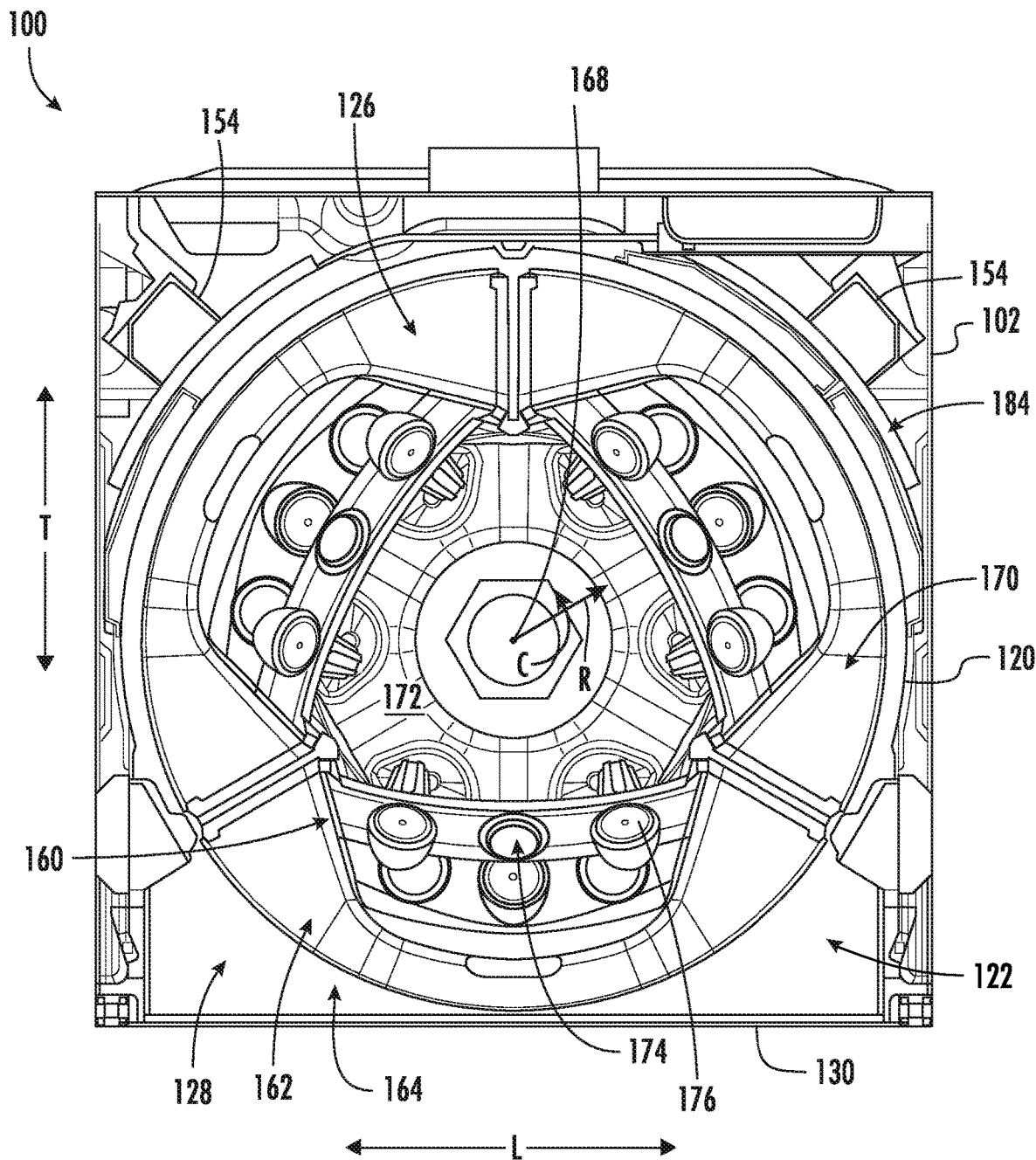
FIG. 6 is a top cross-sectional view of the exemplary gardening appliance of FIG. 1, taken along Line 5-5 from FIG. 2.

Referring now for example to FIGS. 5 and 6, gardening appliance 100 may further include a light assembly 184 which is generally configured for providing light into selected grow chambers 170 to facilitate photosynthesis and growth of plants 124. As shown, light assembly 184 may include a plurality of light sources (not labeled) stacked in an array, e.g., extending along the vertical direction V. For example, light assembly 184 may be mounted directly to liner 120 within climate-controlled chamber 122 or may alternatively be positioned behind liner 120 such that light is projected through a transparent window or light pipe into climate-controlled chamber 122. The position, configuration, and type of light sources described herein are not intended to limit the scope of the present subject matter in any manner.

Light assembly 184 may include any suitable number, type, position, and configuration of electrical light source(s), using any suitable light technology and illuminating in any suitable color. For example, according to the illustrated embodiment, light assembly 184 includes one or more light emitting diodes (LEDs), which may each illuminate in a single color (e.g., white LEDs), or which may each illuminate in multiple colors (e.g., multi-color or RGB LEDs) depending on the control signal from controller 196. However, it should be appreciated that according to alternative embodiments, light assembly 184 may include any other suitable traditional light bulbs or sources, such as halogen bulbs, fluorescent bulbs, incandescent bulbs, glow bars, a fiber light source, etc.

As explained above, light generated from light assembly 184 may result in light pollution within a room where gardening appliance 100 is located. Therefore, aspects of the present subject matter are directed to features for reducing light pollution, or to the blocking of light from light assembly 184 through front display opening 128. Specifically, as illustrated, light assembly 184 is positioned only within the enclosed back portion 126 of liner 120 such that only grow chambers 170 which are in a sealed position are exposed to light from light assembly 184. Specifically, grow tower 160 acts as a physical partition between light assemblies 184 and front display opening 128. In this manner, as illustrated in FIG. 5, no light may pass from the first or second grow chambers 170 (i.e., the "rear" or enclosed grow chambers 170) through grow tower 160 and out through front display opening 128. As grow tower 160 rotates, two of the three grow chambers 170 will receive light from light assembly 184 at a time. According to still other embodiments, a single light assembly may be used to reduce costs, whereby only a single grow chamber 170 will be illuminated at a single time.

Referring now specifically to FIGS. 3 and 7, gardening appliance 100 may further include a motor assembly 186 or another suitable driving element or device for selectively rotating grow tower 160 during operation of gardening appliance 100. In this regard, according to the illustrated embodiment, motor assembly 186 is positioned below grow tower 160, e.g., within mechanical compartment 136, and may be mechanically coupled to turntable 162 for selectively rotating turntable 162 and grow tower 160 about central axis 168.

As used herein, "motor" may refer to any suitable drive motor and/or transmission assembly for rotating turntable 162 and grow tower 160. For example, motor assembly 186 may include a brushless DC electric motor, a stepper motor, or any other suitable type or configuration of motor. For example, motor assembly 186 may include an AC motor, an induction motor, a permanent magnet synchronous motor, or any other suitable type of AC motor. In addition, motor assembly 186 may include any suitable transmission assemblies, clutch mechanisms, or other components.

Referring again to FIG. 2, gardening appliance 100 may include a control panel 190 that may represent a general-purpose Input/Output ("GPIO") device or functional block for gardening appliance 100. In some embodiments, control panel 190 may include or be in operative communication with one or more user input devices 192, such as one or more of a variety of digital, analog, electrical, mechanical, or electro-mechanical input devices including rotary dials, control knobs, push buttons, toggle switches, selector switches, and touch pads.

Additionally, gardening appliance 100 may include a display 194, such as a digital or analog display device generally configured to provide visual feedback regarding the operation of gardening appliance 100. For example, display 194 may be provided on control panel 190 and may include one or more status lights, screens, or visible indicators. According to exemplary embodiments, user input devices 192 and display 194 may be integrated into a single device, e.g., including one or more of a touchscreen interface, a capacitive touch panel, a liquid crystal display (LCD), a plasma display panel (PDP), a cathode ray tube (CRT) display, or other informational or interactive displays.

Gardening appliance 100 may further include or be in operative communication with a processing device or a controller 196 that may be generally configured to facilitate appliance operation. In this regard, control panel 190, user input devices 192, and display 194 may be in communication with controller 196 such that controller 196 may receive control inputs from user input devices 192, may display information using display 194, and may otherwise regulate operation of gardening appliance 100. For example, signals generated by controller 196 may operate gardening appliance 100, including any or all system components, subsystems, or interconnected devices, in response to the position of user input devices 192 and other control commands. Control panel 190 and other components of gardening appliance 100 may be in communication with controller 196 via, for example, one or more signal lines or shared communication busses. In this manner, Input/Output ("I/O") signals may be routed between controller 196 and various operational components of gardening appliance 100.

As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 196 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 196 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, controller 196 may be operable to execute programming instructions or micro-control code associated with an operating cycle of gardening appliance 100. In this regard, the instructions may be software or any set of instructions that when executed by the processing device, cause the processing device to perform operations, such as running one or more software applications, displaying a user interface, receiving user input, processing user input, etc. Moreover, it should be noted that controller 196 as disclosed herein is capable of and may be operable to perform any methods, method steps, or portions of methods as disclosed herein. For example, in some embodiments, methods disclosed herein may be embodied in programming instructions stored in the memory and executed by controller 196.

The memory devices may also store data that can be retrieved, manipulated, created, or stored by the one or more processors or portions of controller 196. The data can include, for instance, data to facilitate performance of methods described herein. The data can be stored locally (e.g., on controller 196) in one or more databases and/or may be split up so that the data is stored in multiple locations. In addition, or alternatively, the one or more database(s) can be connected to controller 196 through any suitable network(s), such as through a high bandwidth local area network (LAN) or wide area network (WAN). In this regard, for example, controller 196 may further include a communication module or interface that may be used to communicate with one or more other component(s) of gardening appliance 100, controller 196, an external appliance controller, or any other suitable device, e.g., via any suitable communication lines or network(s) and using any suitable communication protocol. The communication interface can include any suitable components for interfacing with one or more network(s), including for example, transmitters, receivers, ports, controllers, antennas, or other suitable components.

According to an exemplary embodiment, motor assembly 186 may be operably coupled to controller 196, which is programmed to rotate grow tower 160 according to predetermined operating cycles, based on user inputs (e.g., via touch buttons 192), etc. In addition, controller 196 may be communicatively coupled to one or more sensors, such as temperature or humidity sensors, positioned within the various chambers 170 for measuring temperatures and/or humidity, respectively. Controller 196 may then operate motor assembly 186 in order to maintain desired environmental conditions for each of the respective chambers 170. For example, as described herein, gardening appliance 100 includes features or subsystems for providing certain locations of gardening appliance 100 with light, temperature control, proper moisture, nutrients, and other requirements for suitable plant growth. Motor assembly 186 may be used to position specific chambers 170 where needed to receive such growth requirements.

According to an exemplary embodiment, such as where grow tower 160 divides climate-controlled chamber 122 into three grow chambers 170, controller 196 may operate motor assembly 186 to index grow tower 160 sequentially through a number of preselected positions. More specifically, motor assembly 186 may rotate grow tower 160 in a counterclockwise direction (e.g., when viewed from a top of grow tower 160) in 120° increments to move chambers 170 between sealed positions and display positions. As used herein, a chamber 170 is considered to be in a "sealed position" when that chamber 170 is substantially sealed between grow tower 160 and liner 120. By contrast, a chamber 170 is considered to be in a "display position" when that chamber 170 is at least partially exposed to front display opening 128, such that a user may access plants 124 positioned within that chamber 170.

Figure 4:
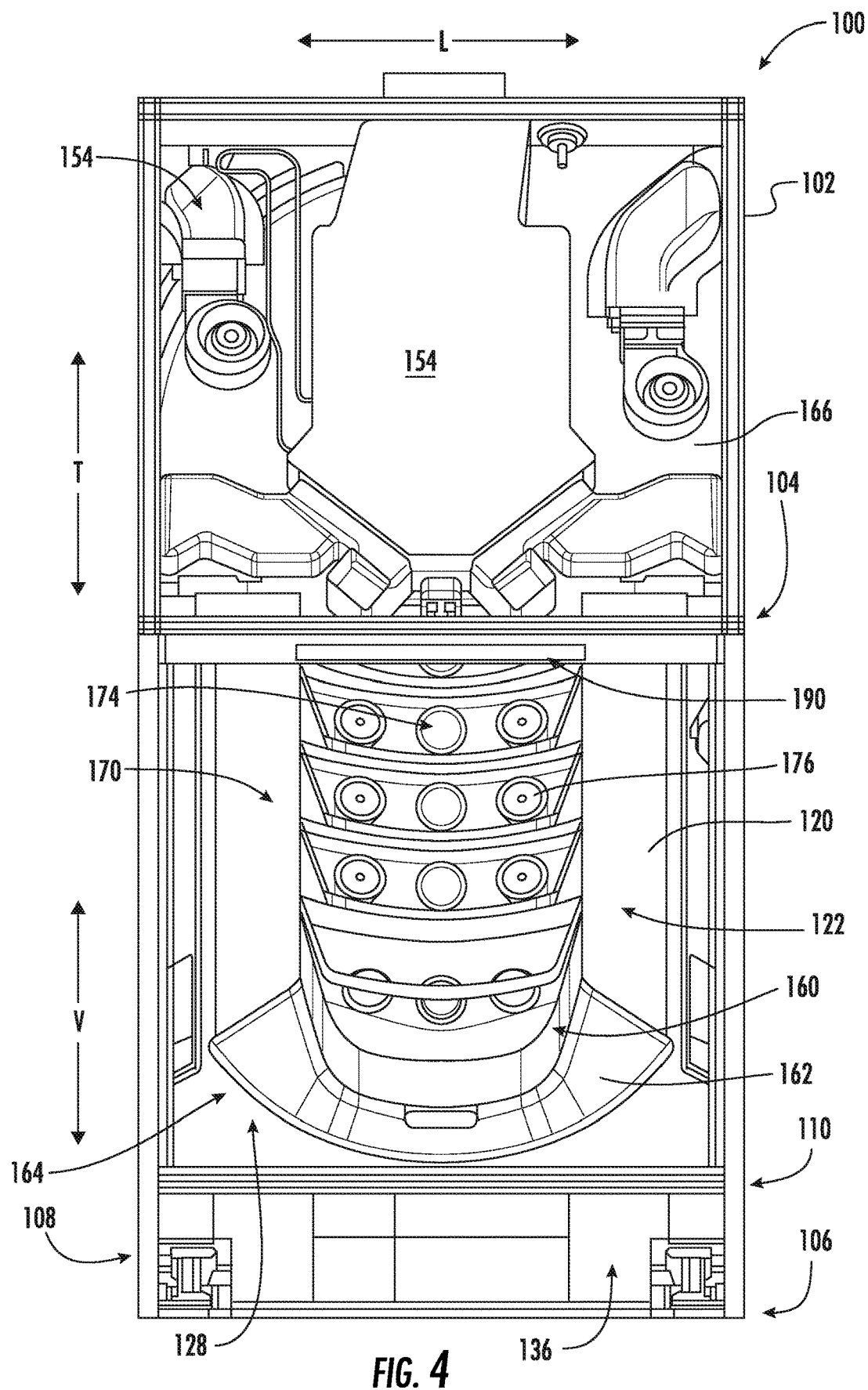
FIG. 4 is a top perspective view of the exemplary gardening appliance of FIG. 1, with a top panel and doors removed according to an exemplary embodiment of the present subject matter.

For example, as illustrated in FIGS. 4 and 5, the first grow chamber and the second grow chamber (i.e., the rear chambers) are both in a sealed position, whereas the third grow chamber (i.e., the front chamber) is in a display position. As motor assembly 186 rotates grow tower 160 by 120 degrees in the counterclockwise direction, the second grow chamber will enter the display position, while the first grow chamber and the third grow chamber will be in the sealed positions. Motor assembly 186 may continue to rotate grow tower 160 in such increments to cycle grow chambers 170 between these sealed and display positions.

Gardening appliance 100 and grow tower 160 have been described above to explain an exemplary embodiment of the present subject matter. However, it should be appreciated that variations and modifications may be made while remaining within the scope of the present subject matter. For example, according to alternative embodiments, gardening appliance 100 may be a simplified to a two-chamber embodiment with a square liner 120 and a grow tower 160 that divides the climate-controlled chamber 122 in half to define a first grow chamber and a second grow chamber. According to such an embodiment, by rotating grow tower 160 by 180 degrees about central axis 168, the first chamber may alternate between the sealed position (e.g., facing rear side 114 of cabinet 102) and the display position (e.g., facing front side 112 of cabinet 102). By contrast, the same rotation will move the second chamber from the display position to the sealed position.

According to still other embodiments, gardening appliance 100 may include a three chamber grow tower 160 but may have a modified cabinet 102 such that front display opening 128 is wider and two of the three grow chambers 170 are displayed at a single time. Thus, the first grow chamber may be in the sealed position, while the second grow chamber and the third grow chamber may be in the display positions. As grow tower 160 is rotated counterclockwise, the first grow chamber is moved into the display position and the third grow chamber is moved into the sealed position.

Figure 8:
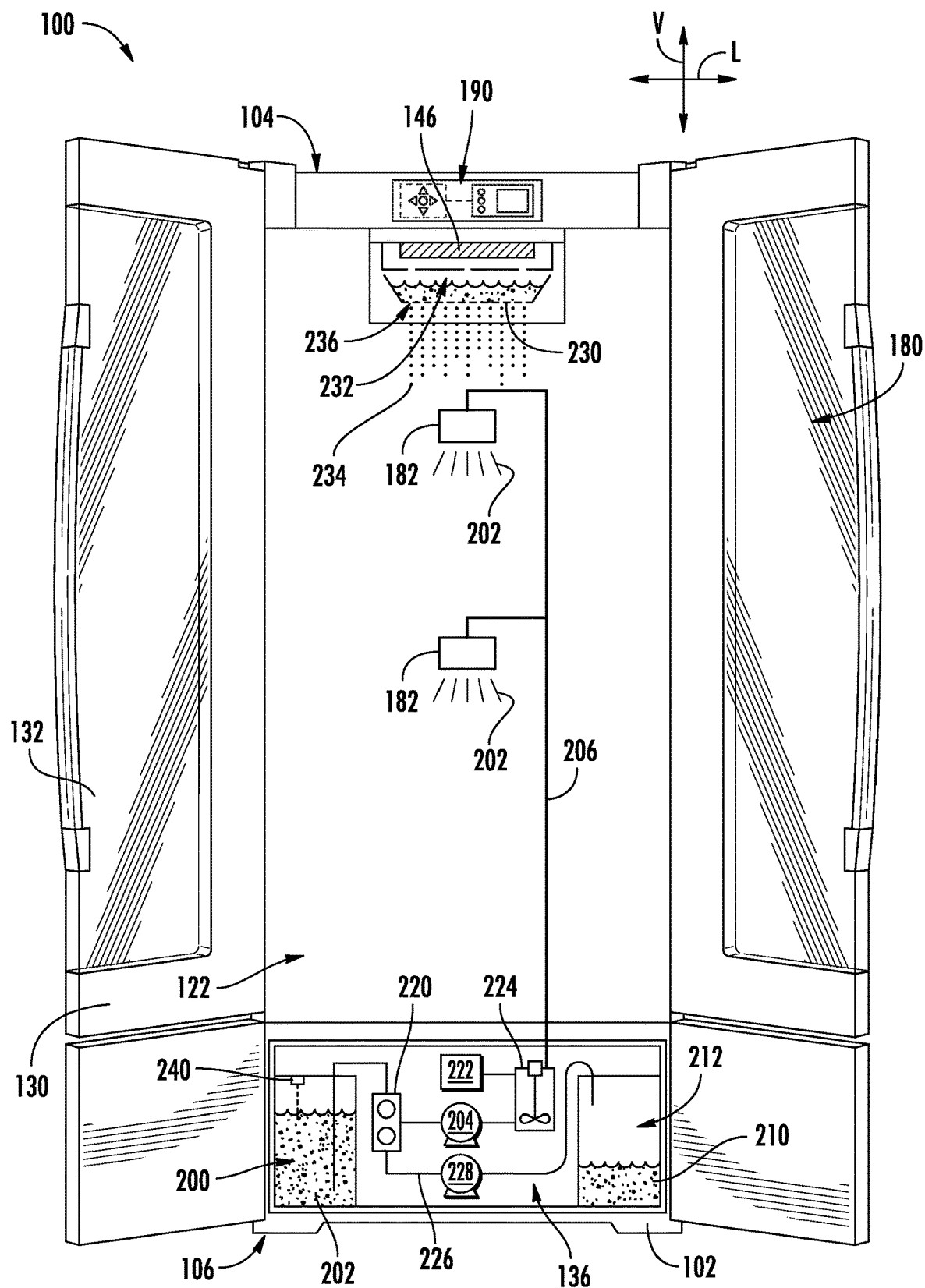
FIG. 8 provides a front schematic view of the exemplary gardening appliance of FIG. 1 and a hydration system according to an exemplary embodiment of the present subject matter.

Referring now generally to FIG. 8, hydration system 180 will be described in more detail according to exemplary embodiments of the present subject matter. In this regard, FIG. 8 provides a front view of gardening appliance 100 with grow tower 160 removed for clarity according to example embodiments. Although an exemplary hydration system 180 will be described herein as being used with the exemplary gardening appliance 100, it should be appreciated that variations to hydration system 180 may be made and hydration system may be used in different gardening appliances while remaining within the scope of the present subject matter.

According to the illustrated embodiment, hydration system 180 may generally include a water supply tank 200 that is generally configured for storing freshwater (e.g., as indicated by reference numeral 202 in FIG. 8) that is selectively provided into root chamber 172 for hydrating plants 124 during a hydration cycle. For example, freshwater 202 may be pure tap water, distilled water, or water from any other external fluid supply source. According to the illustrated embodiment, water supply tank 200 is a removable water storage tank that may be filled by a user and that is contained within cabinet 102. In this regard, a user may periodically remove water supply tank 200 and fill it with freshwater 202 or may otherwise fluidly couple a water supply for periodically replenishing freshwater within water supply tank 200. According to alternative embodiments, water supply tank may be replaced by or coupled to a municipal water supply that provides a flow of pressurized water into hydration system 180. It should be appreciated that water supply tank 200 may include any suitable pumps, flow regulating valves, or other flow regulating devices needed to regulate the flow of freshwater 202.

According to exemplary embodiments, hydration system 180 may include any suitable number and configuration of pumps, devices, or mechanisms for selectively urging the nutrient mixture or the flow of liquid onto plants 124. For example, according to the illustrated embodiment, hydration system 180 includes a freshwater supply pump 204 that is fluidly coupled to a supply conduit 206 for selectively pressurizing and urging a flow of water and/or other nutrients (e.g., referred to herein as freshwater 202) through supply conduit 206.

In addition, as explained above, hydration system 180 includes one or more discharge nozzles or misting nozzles 182 that are in fluid communication with supply conduit 206. Thus, freshwater supply pump 204 may be configured for selectively operating to provide the freshwater 202 through misting nozzles 182 into root chamber 172 and/or climate-controlled chamber 122 to hydrate plants 124. Although one exemplary configuration of discharge nozzles 182 is described herein, it should be appreciated that discharge nozzles 182 may include any other suitable number, type, configuration, and position of devices for supplying water, hydration, or other nutrients to plants 124 (e.g., such as a two-nozzle configuration illustrated in FIG. 8).

As explained briefly above, freshwater 202 that is supplied into root chamber 172 to hydrate plants 124 is not commonly absorbed or used completely by plants 124. As a result, a certain portion of freshwater 202 may drip off of the roots of plants 124 or may drip down the walls of grow tower 160. This water, referred to herein as wastewater 210, generally falls under the force of gravity down to sump 164 where it is collected. Hydration system 180 may include a wastewater tank 212 that is fluidly coupled to sump 164 for collecting wastewater 210.

According to exemplary embodiments, hydration system 180 may further include an auxiliary water supply system that may selectively use wastewater 210 in certain situations, e.g., such as situations where the available freshwater 202 within water supply tank 200 is insufficient to meet the needs of plants 124. This auxiliary water supply system may include the same or similar pumps, valves, and other flow regulating features as described above to selectively provide the flow of wastewater 210 into root chamber 172. Specifically, according to the illustrated embodiment, auxiliary water supply system may include a wastewater supply pump (not shown) that is fluidly coupled to wastewater tank 212 for providing wastewater 210 through a wastewater conduit (not shown) into root chamber 172.

According to exemplary embodiments, hydration system 180 may include an accumulator (not shown) that is generally configured for receiving and storing pressurized water or liquid. In this regard, the term "accumulator" may generally be used to refer to any suitable device for receiving, storing, and distributing pressurized liquid. For example, the accumulator may be a sealed container containing an air bladder that is compressed as pressurized water is supplied into the accumulator all. The air within the air bladder may be compressed to maintain the pressure of the water within the accumulator and may expand to discharge water when the supply conduit 206 is no longer pressurized. In this manner, the accumulator may operate to absorb hydraulic disturbances and maintain a substantially constant pressure and flow rate for the freshwater 202. It should be appreciated that other means for maintaining the hydraulic pressure within the accumulator may be used while remaining within the scope of the present subject matter. According to exemplary embodiments, hydration system 180 may further include one or more valves positioned throughout hydration system 180 for regulating the flow of liquid or other fluid flows therein.

According to exemplary embodiments, a filtration system 220 is integrated into hydration system 180 of gardening appliance 100 that includes one or more filters that are generally configured for receiving and filtering freshwater 202. Specifically, according to the exemplary embodiments, filtration system 220 includes a reverse osmosis filter. As used herein, the term "reverse osmosis filter" is generally intended refer to any suitable number, type, and configuration of filters that implement a reverse osmosis process to remove contaminants from freshwater 202. For example, according to an exemplary embodiment, the reverse osmosis filter may utilize membrane or hollow fiber separation technologies, although any other suitable reverse osmosis technology may be used according to alternative embodiments.

In this regard, reverse osmosis is generally the process of filtering water using a semipermeable membrane that allows freshwater to permeate from a contaminated side of the membrane, through the semipermeable membrane, and into a filtered side of the semipermeable membrane. Contaminants, e.g., dissolved solids, in freshwater 202 are not permitted to pass through the semipermeable membrane create a liquid with concentrated contaminants. Further details regarding the reverse osmosis process are omitted here for brevity but should be understood by one of ordinary skill in the art.

According to the exemplary embodiments, filtration system 220 may further include one or more prefilters that filter freshwater 202 before passing it into the reverse osmosis filter. For example, the prefilters may include an activated carbon filter (not shown) that reduces multiple organic compounds (VOCs), chlorine, and any other contaminants that may result in a bad taste or odor freshwater 202. It should be appreciated that any suitable number, type, and configuration of filters maybe used according to exemplary embodiments.

According to exemplary embodiments, hydration system 180 may further include a nutrient dosing system 222 that is generally configured for facilitating the distribution of nutrient-rich liquid throughout gardening appliance 100 for improved plant growth. In this regard, for example, the nutrient dosing system 222 may include a nutrient supply and a mixing system that provides a flow of nutrients in the desired concentrations. The nutrient dosing system 222 may include replaceable or refillable nutrient cartridges that are filled with nutrients in concentrated form or may receive a nutrient supply from any other suitable location. As used herein, the term "nutrients" and the like are intended generally to refer to any substances which facilitate improved growth of plants 124. For example, according to exemplary embodiments, nutrients may include calcium, magnesium, potassium, sulfur, copper, zinc, boron, molybdenum, iron, cobalt, manganese, phosphorous, and chlorine. Nutrients may also be used to refer to chemicals or substances that can be used to adjust a pH of the nutrient mixture, a level of total dissolved solids (TDS), etc. According to alternative embodiments, any other suitable mixture or combination of compositions for encouraging root growth and plant growth may be used while remaining within the scope of the present subject matter.

The nutrient dosing system 222 may further include features for discharging selected flow rates or volumes of nutrients, such as pumps or discharge mechanisms. According to exemplary embodiments, the nutrient dosing system 222 may include a plurality of nutrient dosing pumps, such as solenoid-actuated plunger valves, a dedicated pump (e.g., such as a peristaltic pump), or a flow regulating valve that may selectively dispense any desired nutrients, at desired rates, and at desired times. Thus, the nutrient dosing system 222 provides any suitable number, type, and combinations of nutrients at any suitable flow rates and volumes for mixing within hydration system 180.

For example, according to exemplary embodiments, the nutrient dosing system 222 may include a plurality of flow regulating valves, discharge mechanisms, pumps, and supply nozzles that are all in operative communication with controller 196 of gardening appliance 100. As such, controller 196 may make informed decisions regarding the desired flow of diluted nutrient mixture based on the type, quality, and position of plants 124 within grow tower 160. For example, controller 196 may regulate the type of nutrients supplied, the nutrient concentrations, which nozzles receive the flow of diluted nutrients, etc. In addition, the nutrient dosing system 222 may make other adjustments that facilitate improved plant growth and ecosystem health within gardening appliance 100.

According to the exemplary embodiments, hydration system 180 may further include a mixing tank 224 that is generally configured for mixing freshwater 202 with nutrients from the nutrient dosing system 222. The mixing tank 224 may include any suitable agitators, stirrers, or other devices for creating a flow of nutrient rich mixture. In general, the mixing tank 224 includes an internal mixing reservoir that receives water and nutrients to create the freshwater 202. Controller 196 of gardening appliance 100 may independently regulate the nutrient dosing system 222 to provide the desired amount and concentration of nutrients into the mixing tanks 224 and the resulting freshwater 202 may be selectively discharge through the one or more discharge valves 182.

Notably, it may be desirable to periodically purge the filtration system 220, e.g., to discharge collected contaminants. Accordingly, according to the illustrated embodiment, hydration system 180 includes a purge conduit 226 that provides fluid communication between filtration system 220 and wastewater tank 212. In addition, hydration system 180 includes a purge pump 228 that is fluidly coupled to purge conduit 226 and is selectively operated to draw freshwater 202 through filtration system 220 to collect contaminants and subsequently discharges the freshwater 202 and contaminants into wastewater tank 212.

According to exemplary embodiments, evaporator 146 of sealed system 142 generates condensate during operation. This condensate may be collected and used to hydrate plants 124, thereby reducing the water supply burden on water supply tank 200 and requiring less frequent filling of any water supply tanks. Accordingly, hydration system 180 may further include a drip tray 230 that is positioned below evaporator 146 and which defines a reservoir 232 for collecting condensate (e.g., identified generally by reference numeral 234) that is formed by the evaporator 146 while sealed system 142 is operating. In general, drip tray 230 may define one or more apertures 236 that permit the condensate to flow from an evaporator plenum through a bottom wall of drip tray 230 and into root chamber 172. Using condensate in this manner improves water usage efficiency, wastewater storage efficiency, and performance of gardening appliance 100.

As described in more detail below, it may be desirable to monitor the level of freshwater 202 within water supply tank 200 to ensure that water is available when desirable for improved plant growth. Accordingly, hydration system 180 may further include a water level sensor 240 which is configured for detecting a level of freshwater 202 within water supply tank 200. Controller 196 may be in operative communication with water level sensor 240 for monitoring water levels and implementing hydration cycles that depend at least in part on the measured water levels.

According to the illustrated embodiment, water level sensor 240 is an infrared sensor for detecting the level of freshwater within water supply tank 200. However, it should be appreciated that any other suitable water level measuring mechanisms may be used according to alternative embodiments. For example, water level sensor 240 could alternatively include a float and reed switch assembly, a capacitive sensor, a conductivity sensor, etc. Water level sensor 240 may be communicatively coupled with controller 196, e.g., so that one or more signals may be routed therebetween. It should be appreciated that hydration system 180 may include any other suitable number, type, and configuration of water level sensing devices while remaining within the scope of the present subject matter.

Now that the construction of gardening appliance 100 has been presented according to an exemplary embodiment, an exemplary method 300 of operating a gardening appliance will be described. Although the discussion below refers to the exemplary method 300 of operating gardening appliance 100, one skilled in the art will appreciate that the exemplary method 300 is applicable to the operation of a variety of other gardening appliances. In exemplary embodiments, the various method steps as disclosed herein may be performed by controller 196 or a separate, dedicated controller.

Figure 9:
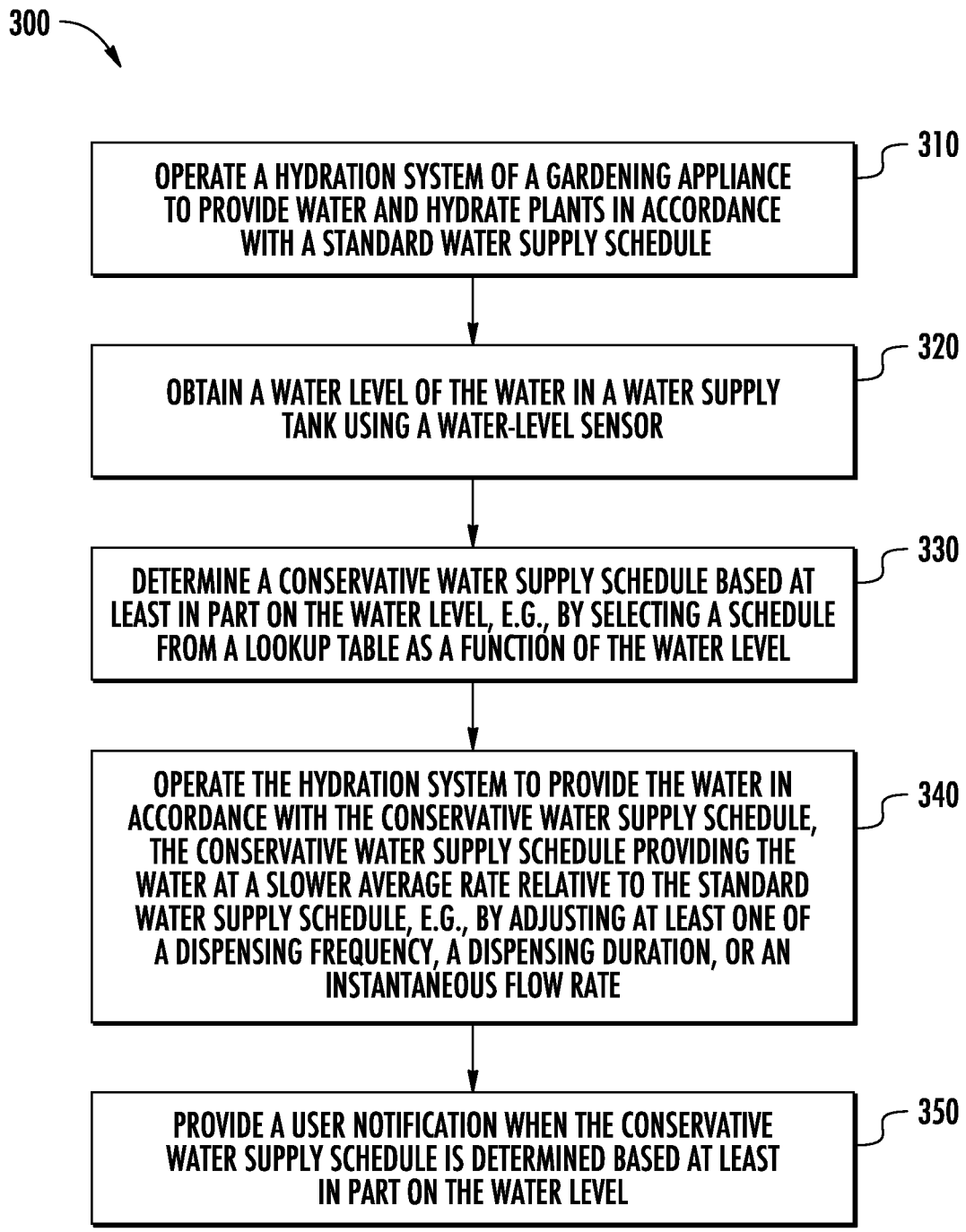
FIG. 9 provides a method of operating a hydration system of an indoor gardening appliance according to an exemplary embodiment of the present subject matter.

Referring now to FIG. 9, method 300 includes, at step 310, operating a hydration system of a gardening appliance to provide water and hydrate plants in accordance with a standard water supply schedule. In this regard, step 310 may generally correspond to the operation of gardening appliance 100 under normal operating conditions when there are no current or impending water supply conditions. However, as will be described in more detail below, aspects of the present subject matter are directed to methods for operating the hydration system of a gardening appliance in the event that a water supply limitation or potential restriction exists.

As used herein, the terms "water supply schedule" and the like are generally intended to refer to the operating conditions or parameters of a hydration system of a gardening appliance. In this regard, for example, the water supply schedule may specify when a hydration cycle is performed, the frequency of dispensing periods, the volume or flow rate of water dispensed within a dispensing period, the nozzles activated during a dispensing period, or any other adjustments that may be made to hydration system 180 or gardening appliance 100 to affect the amount of moisture, water, nutrients, or hydration perceived by plants 124.

Specifically, according to exemplary embodiments, a given water supply schedule may specify a "dispensing frequency" that corresponds to the amount of time between the initiation of a water dispensing period. In this regard, for example, a hydration cycle may include the repeated performance of dispensing periods. The "dispensing duration" may generally refer to the amount of time that water is being dispensed during each dispensing period. The "dispensing frequency" may generally refer to the amount of time that passes between the initiation of dispensing periods. Accordingly, for example, a standard or normal hydration cycle may involve activating hydration system 180 to supply mist through misting nozzles 182 every 5 minutes for 30 seconds. Accordingly, such a standard hydration cycle would have a 30-second dispensing duration and a 5-minute dispensing frequency (e.g., or 30-seconds ON, 4 minutes and 30 seconds OFF, and repeat). It should be appreciated that these dispensing durations and frequencies are only exemplary and are not intended to limit the scope of the present subject matter in any manner. In addition, although the present disclosure contemplates fixed frequency dispensing periods, it should be appreciated that water supply schedule may include dispensing periods that vary in frequency, duration, flow rate, etc.

It should be appreciated that the water supply schedule may include additional adjustments to hydration system 180 and that are generally intended to affect the amount of water and/or nutrients supplied into root chamber 172. In this regard, for example, the water supply schedule may include an instantaneous flow rate, which refers to the flow rate of fluid through hydration system 180 and out of misting nozzles 182 at any given moment during a dispensing period. In this regard, for example, during the 30-second dispensing duration described above, the instantaneous flow rate may be the volume of water exiting misting nozzles 182 at any given moment or during that particular dispensing duration (e.g., measured in Liters/second or any other volumetric flow rate). In addition, the water supply schedule may include a spray angle of each misting nozzle 182, a volume through each misting nozzle 182, a direction of mist application, etc.

In general, all of these different parameters of the water supply schedules may be used to determine an average hydration rate of any given water supply schedule. In this regard, the "average hydration rate" of a particular hydration schedule may refer to any measure of hydration supply to plants 124 over an entire hydration schedule or hydrating period. For example, the average hydration rate may be a measure of the volumetric flow rate of liquid over all dispensing periods within the water supply schedule. Thus, for example, if the water supply schedule was activated to cover eight hours of hydration, the average hydration rate may refer to the total volume of water dispensed over those eight hours divided by eight hours.

According to still other embodiments, the average hydration rate may refer to a percentage or a ratio of the hydration rate of that water supply schedule relative to the hydration rate associated with the standard, normal, or optimal water supply schedule. In this regard, for example, the standard, normal, or optimal water supply schedule may be selected by the manufacturer or by the user as the desired amount of water or hydration to be supplied to all plants 124 within gardening appliance 100 to achieve the desired growth. In other words, the standard water supply schedule may refer to the optimal amount of water for growing plants without overwatering, under watering, or providing improper amounts of nutrition for the one or more plants 124 located within gardening appliance 100. For example, an average hydration rate that is 0.8 or 80% may correspond to a water supply schedule that provides approximately 80% of the hydration that the standard water supply schedule would provide. Other manners of measuring a hydration rate of water supply schedules are possible and within the scope of the present subject matter.

Step 320 may generally include obtaining a water level of the water in a water supply tank using a water level sensor. Continuing the example from above, controller 196 may utilize water level sensor 240 within water supply tank 200 to determine the amount of freshwater 202 available for hydration. In certain situations, it may be desirable to adjust water supply schedules based on the measured water level. In this regard, when the water level becomes low or there is an anticipated period when the user is going to be unable to refill water supply tank 200, it may be desirable to adjust the water supply schedule such that hydration system 180 may hydrate plants 124 over the same amount of time as the standard hydration schedule, though maybe at a lower hydration rate (e.g., to avoid running out of water and leaving plants 124 without water for an extended period of time).

Accordingly, step 330 may include determining a conservative water supply schedule based at least in part on the water level (e.g., as measured at step 320). As explained briefly above, the conservative water supply schedule may be selected in any manner and is generally intended to stretch the amount of available freshwater 202 over a predetermined time period instead of dispensing at the standard water supply schedule and running out of water before the water supply tank 200 is refilled. For example, the conservative water supply schedule may include decreasing the dispensing frequency, decreasing the dispensing duration, or decreasing the instantaneous flow rate, relative to the standard water supply schedule. In general, this manner of slowly hydrating plants 124 a help keep plants 124 alive until the water supply tank 200 is refilled.

It should be appreciated that the conservative water supply schedule may be determined in any suitable manner. For example, according to an exemplary embodiment, the conservative water supply schedule may be selected from a lookup table (e.g., stored in controller 196) as a function of the water level measured at step 320. In other words, controller 196 could use the measured water level to generate the detailed parameters associated with the conservative water supply schedule. According to still other embodiments, any other suitable mathematical algorithm or transfer function may be used to utilize the input of the measured water level to generate a conservative water supply schedule.

According to exemplary embodiments, controller 196 may be programmed with a predetermined number (e.g., four) water supply schedules, each associated with a tank capacity range. Method 300 may include operating hydration system 180 at the water supply schedule associated with the measured water level or its associated tank capacity range. In this regard, for example, if the measured water level is between about 75% and 100% of the total tank capacity, the standard water supply schedule may be used. By contrast, if the measured water level is between about 50% and 75% of the total tank capacity, a moderate water supply schedule may be selected as the conservative water supply schedule for use by hydration system 180. If the measured water level is between about 25% and 50% of the total tank capacity, a critical water supply schedule may be selected as the conservative water supply schedule for use by hydration system 180. If the measured water level is between about 0% and 25% of the total tank capacity, a super-critical water supply schedule may be selected as the conservative water supply schedule for use by hydration system 180. It should be appreciated that other ranges and water supply schedules are possible and within the scope of the present subject matter.

Step 340 may include operating hydration system to provide the water in accordance with the conservative water supply schedule. As explained above, the conservative water supply schedule may include providing the water at a slower average rate relative to the standard water supply schedule, e.g., by adjusting at least one of a dispensing frequency, a dispensing duration, or an instantaneous flow rate. As explained above, step 340 may be beneficial in that it stretches the amount of available water over a longer period of time than the standard water supply schedule, e.g., to maintain the health of plants (e.g., even if growth is suboptimal or less than what would be achieved using the standard water supply schedule).

Method 300 may further include, at step 350, providing a user notification when the conservative water supply schedule has been determined based at least in part on the water level. In this regard, for example, it may be desirable to communicate with the user of gardening appliance 100 when operation of hydration system 180 has been adjusted due to low water situations or anticipated low water situations. In this manner, the user may be notified and may take corrective action, such as refilling water supply tank 200. In this regard, for example, the user may be informed as to a reduction in performance of hydration system 180 due to a low water supply to motivate corrective action.

In addition, method 300 may include communicating with the user to receive notification of or otherwise detecting a user inactivity period. In this regard, the user inactivity periods may generally refer to a time when a user does not wish to be disturbed, is asleep, is at work, is on vacation, or is otherwise unavailable. These user inactivity periods may be determined in any suitable manner, such as analyzing routines or habits, via the user input, by accessing a user's calendar, or any other suitable manner. For example, a user may program gardening appliance 100 to not disturb the user during a scheduled sleep time (e.g., between 10:00 PM and 6:00 AM). According to exemplary embodiments, method 300 may include performing a water assessment prior to or at the commencement of the user inactivity period. In this regard, for example, at 10:00 PM, controller 196 may assess the measured water level and determine the conservative water supply schedule that may be needed to hydrate plants until 6:00 AM.

According to still other embodiments, method 300 may include determining the conservative water supply schedule based at least in part on the water assessment and providing a notification to the user that the conservative water supply schedule will be implemented during the user inactivity period unless the user refills the water supply tank 200. In this regard, the user may be notified at 10:00 PM that there is insufficient water within water supply tank 200 to perform the standard water supply schedule throughout the night. According to exemplary embodiments, if the user does not refill the water supply tank 200, method 300 may include determining a number of dispensing periods that may be performed with the remaining water within water supply tank 200 and may adjust the dispensing frequency to evenly perform the number of dispensing periods over the user inactivity period. Other variations to the water supply schedule may be made while remaining within the scope of the present subject matter.

According to still other embodiments, method 300 may include receiving a command to enter a water savings mode. In this regard, the command to enter the water savings mode may be received by a user, e.g., through control panel 190 or in any other suitable manner. After receiving the command to enter the water savings mode, gardening appliance 100 may adjust various operating parameters to reduce the overall amount of liquid used or consumed. In this regard, for example, controller 196 may operate light assembly 184 to decrease the overall light applied, thereby slowing plant growth and minimizing the need of the growth needs of the plants. According to still other embodiments, the number of purge cycles applied to filtration system 220 may be reduced (e.g., to reduce the amount of water used during such purge cycles and save such water for hydration cycles). According to still other embodiments, operating parameter adjustments may include operating the nutrient dosing system 222 to adjust a nutrient level within the water provided into the root chamber. For example, by applying a particular nutrient to plants during periods of lower hydration, hydration system 100 may be better able to maintain the health of plants 124 until additional water is supplied.

FIG. 9 depicts steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of method 300 are explained using gardening appliance 100 as an example, it should be appreciated that this method may be applied to the operation of any other suitable gardening appliance.

As explained herein, aspects of the present subject matter are generally directed to an aeroponic growing appliance featuring improved systems and methods of operation to extend water tank usage or provide advance user notification about water level in a plant-growing appliance. The method may include using a water level sensing device to sense the remaining water level in the water tank and setting the water dispensing interval based on the water level. In addition, or alternatively, the method may include notifying a user that the tank will run empty during a user inactivity period (e.g., such as during the night or a time when the user is otherwise unavailable) and when the tank needs to be refilled. By contrast, using conventional methods, a user is not able to interact with the water tanks sooner or during the middle of the nighttime where the water tanks would run empty and this may result in the death or poor health of plants.

According to exemplary embodiments, the plant growing appliance may spray or supply a fixed amount of water in time intervals, and the present method may include determining when the water level of the water supply tank reaches a threshold level, at which time the time between each spray may be increased by a certain percentage, also the time interval may step up as water level is lowered. For example, when the water tank level is in the 100% to 51% range, the appliance may operate in its ideal timing or timing selected for optimal plant growth; when the water level reaches 50% to 21%, the time between sprays may be increased by 15%; when the water level reaches <20%, the time between sprays may further increase by 30%.

According to still other embodiments, the water level sensing device may be used to calculate the water usage rate and estimate how the percentage of water used over a set amount of time. If the user sets a user inactivity period or a "do not disturb" time, the user may receive a notification on the water level at the set notification time. The method may notify the user to fill water if the water level is below a critical level at the set notification time. If the water level is above the critical level, then the remaining water should last through the remainder of the user inactivity period so nothing changes.

According to still another exemplary embodiment, if the water level is below the critical level, the method looks at the number of dispenses possible with the remaining amount of water in the tank and then calculates the time between sprays to have an even time between sprays during the "do not disturb time." For example, if "do not disturb time" is 8 hours with 1.5 liters of water left that can be dispensed, and the is typically sprayed 96 times (every 5 minutes) in those 8 hours, but the 1.5 liters of water would only create 75 sprays, then the spray time may change to every 6.5 minutes to last the full 8 hours.

According to another embodiment, a "water saver mode" or "vacation mode" may be set to use least amount of water possible. This mode may alternate between a "no nutrient solution" being sprayed and a "nutrient solution" being sprayed. When the "no nutrient solution" is sprayed, there may be no need to purge the RO system to the waste tank, which would otherwise require additional water to facilitate the purge. With a full supply tank gets 11 mixing tank fills. Every other mixing tank fill may be a no nutrient solution. Therefore, by minimizing the supplied nutrients, the plants will not grow as quickly, and less water is used. Also, this method may also further extend the spraying frequency and decrease LED lighting to minimize photosynthesis needs.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A gardening appliance defining a vertical direction, the gardening appliance comprising:
   a liner positioned within a cabinet and defining a grow chamber;
   a grow tower rotatably mounted within the liner, the grow tower defining a root chamber and a plurality of apertures for receiving one or more plant pods;
   a hydration system comprising a water supply tank for storing water, a supply conduit fluidly coupling the water supply tank to a discharge nozzle, and a supply pump for selectively urging the water through the discharge nozzle;
   a water level sensor operably coupled to the water supply tank; and
   a controller in operative communication with the hydration system and the water level sensor, the controller being configured to:
      operate the hydration system to provide the water in accordance with a standard water supply schedule;
      obtain a water level of the water in the water supply tank using the water level sensor;
      determine a conservative water supply schedule based at least in part on the water level; and
      operate the hydration system to provide the water in accordance with the conservative water supply schedule, the conservative water supply schedule providing the water at a slower average hydration rate relative to the standard water supply schedule.

2. The gardening appliance of claim 1, wherein the standard water supply schedule comprises a dispensing frequency and a dispensing duration selected for optimal growth of plants within the one or more plant pods.

3. The gardening appliance of claim 1, wherein determining the conservative water supply schedule based at least in part on the water level comprises:
   determine that the water level is within a predetermined tank capacity range; and
   selecting the conservative water supply schedule associated with the tank capacity range.

4. The gardening appliance of claim 1, wherein determining the conservative water supply schedule based at least in part on the water level comprises:
   selecting the conservative water supply schedule from a lookup table as a function of the water level.

5. The gardening appliance of claim 1, wherein a dispensing frequency of the standard water supply schedule is higher than a dispensing frequency of the conservative water supply schedule.

6. The gardening appliance of claim 1, wherein a dispensing duration of the standard water supply schedule is higher than a dispensing duration of the conservative water supply schedule.

7. The gardening appliance of claim 1, wherein an instantaneous flow rate of the standard water supply schedule is higher than an instantaneous flow rate of the conservative water supply schedule.

8. The gardening appliance of claim 1, wherein the controller is further configured to provide a user notification when the conservative water supply schedule is determined based at least in part on the water level.

9. The gardening appliance of claim 1, wherein the controller is further configured to:
   receive notification of a user inactivity period;
   perform a water assessment prior to the commencement of the user inactivity period; and
   determine the conservative water supply schedule based at least in part on the water assessment.

10. The gardening appliance of claim 9, wherein the user inactivity period corresponds to a time when a user does not wish to be disturbed, is asleep, is at work, is on vacation, or is unavailable.

11. The gardening appliance of claim 9, wherein determining the conservative water supply schedule comprises selecting at least one of a dispensing frequency, a dispensing duration, or an instantaneous flow rate to evenly discharge the water remaining within the water supply tank over the user inactivity period.

12. The gardening appliance of claim 9, wherein determining the conservative water supply schedule comprises:
   determining a number of dispensing periods that may be performed with the water remaining in the water supply tank; and
   adjusting a dispensing frequency to evenly perform the number of dispensing periods over the user inactivity period.

13. The gardening appliance of claim 1, further comprising a lighting assembly for selectively illuminating the one or more plant pods in the grow chamber, wherein the controller is further configured to:
   receive a command to enter a water savings mode; and
   operating the lighting assembly to decrease light, slow plant growth, and minimize water needs of plants in response to receiving the command to enter the water savings mode.

14. The gardening appliance of claim 1, further comprising a purge pump assembly for selectively purging wastewater from the gardening appliance, wherein the controller is further configured to:
   receive a command to enter a water savings mode; and
   operating the purge pump assembly to decrease a frequency of purge cycles in response to receiving the command to enter the water savings mode.

15. The gardening appliance of claim 1, further comprising a nutrient dosing system for selectively adding nutrients to the water, wherein the controller is further configured to:
   receive a command to enter a water savings mode; and
   operating the nutrient dosing system to adjust a nutrient level within the water provided into the root chamber.

16. A hydration system for a gardening appliance, the gardening appliance comprising a liner positioned within a cabinet and a grow tower rotatably mounted within the liner, the grow tower defining a root chamber and a plurality of apertures for receiving one or more plant pods, the hydration system comprising:
   a water supply tank for storing water;
   a supply conduit fluidly coupling the water supply tank to a discharge nozzle;
   a supply pump for selectively urging the water through the discharge nozzle;
   a water level sensor operably coupled to the water supply tank; and
   a controller in operative communication with the hydration system and the water level sensor, the controller being configured to:
      operate the hydration system to provide the water in accordance with a standard water supply schedule;
      obtain a water level of the water in the water supply tank using the water level sensor;
      determine a conservative water supply schedule based at least in part on the water level; and
      operate the hydration system to provide the water in accordance with the conservative water supply schedule, the conservative water supply schedule providing the water at a slower average hydration rate relative to the standard water supply schedule.

17. The hydration system of claim 16, wherein the standard water supply schedule comprises a dispensing frequency and a dispensing duration selected for optimal growth of plants within the one or more plant pods.

18. The hydration system of claim 16, wherein determining the conservative water supply schedule based at least in part on the water level comprises:
   determine that the water level is within a predetermined tank capacity range; and
   selecting the conservative water supply schedule associated with the tank capacity range.

19. The hydration system of claim 16, wherein determining the conservative water supply schedule based at least in part on the water level comprises:
   selecting the conservative water supply schedule from a lookup table as a function of the water level.

20. The hydration system of claim 16, wherein the controller is further configured to:
   receive notification of a user inactivity period;
   perform a water assessment prior to the commencement of the user inactivity period; and
   determine the conservative water supply schedule based at least in part on the water assessment.

* * * * *